Dec. 20, 1960     M. H. GROVE ET AL     2,965,354
VALVE CONSTRUCTION
Filed Aug. 26, 1957     4 Sheets-Sheet 3
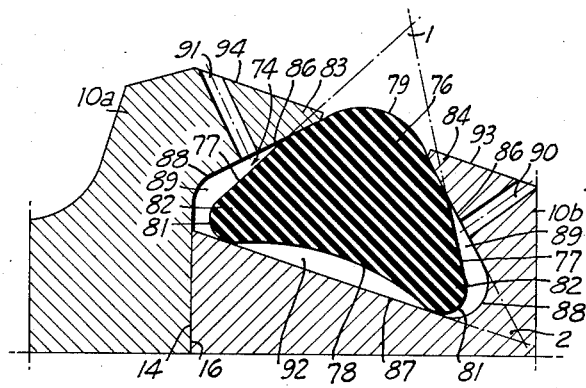
FIG_3_
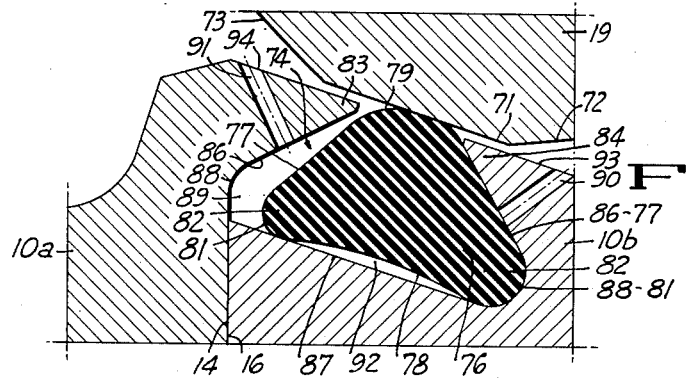
FIG_4_
INVENTORS
Marvin H. Grove
Austin U. Bryant
BY
ATTORNEYS Dec. 20, 1960 M. H. GROVE ET AL 2,965,354
VALVE CONSTRUCTION
Filed Aug. 26, 1957 4 Sheets-Sheet 4
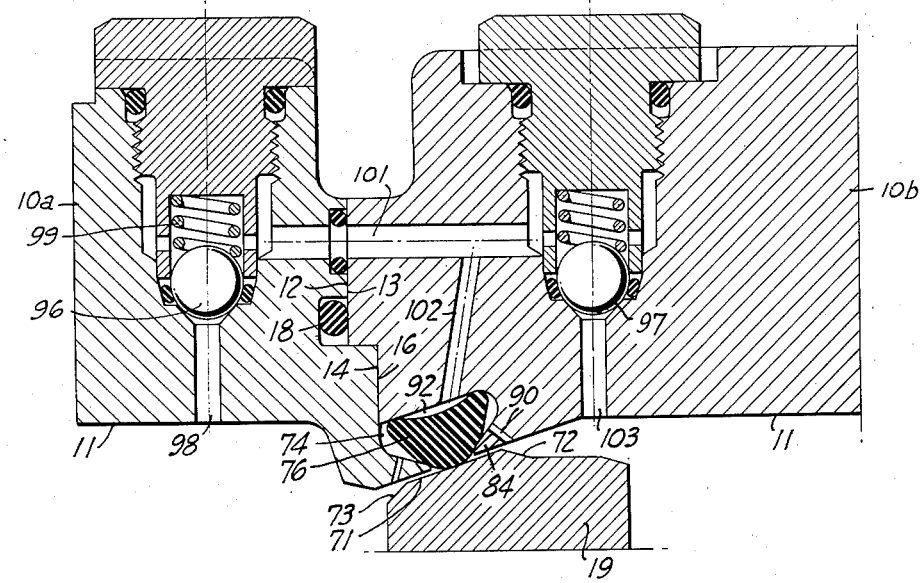
FIG_5_
FIG_6_
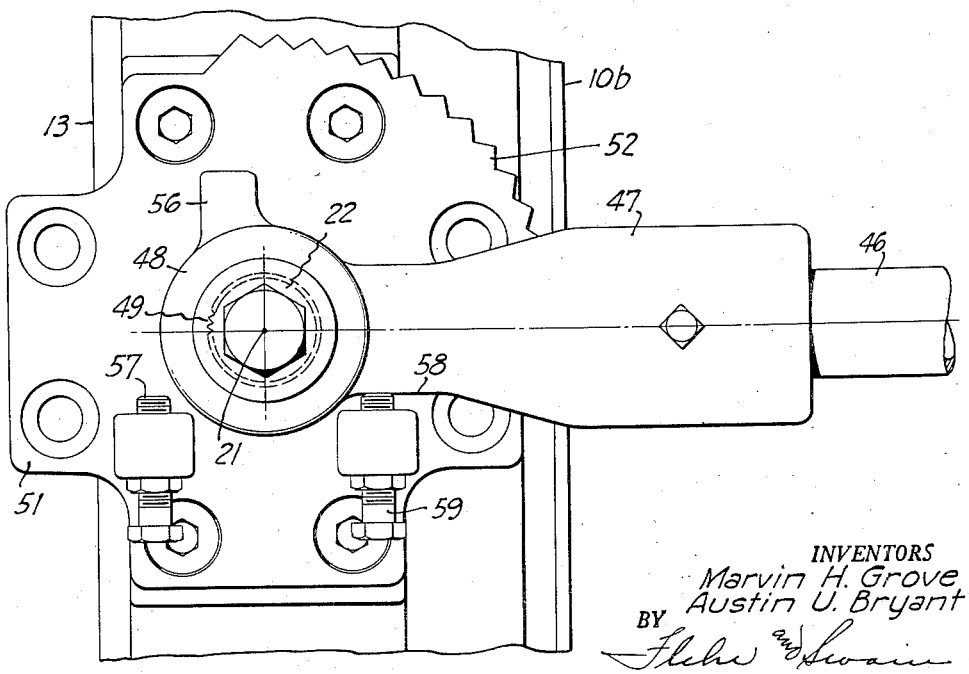
INVENTORS
Marvin H. Grove
Austin U. Bryant
BY
ATTORNEYS

United States Patent Office 2,965,354
Patented Dec. 20, 1960

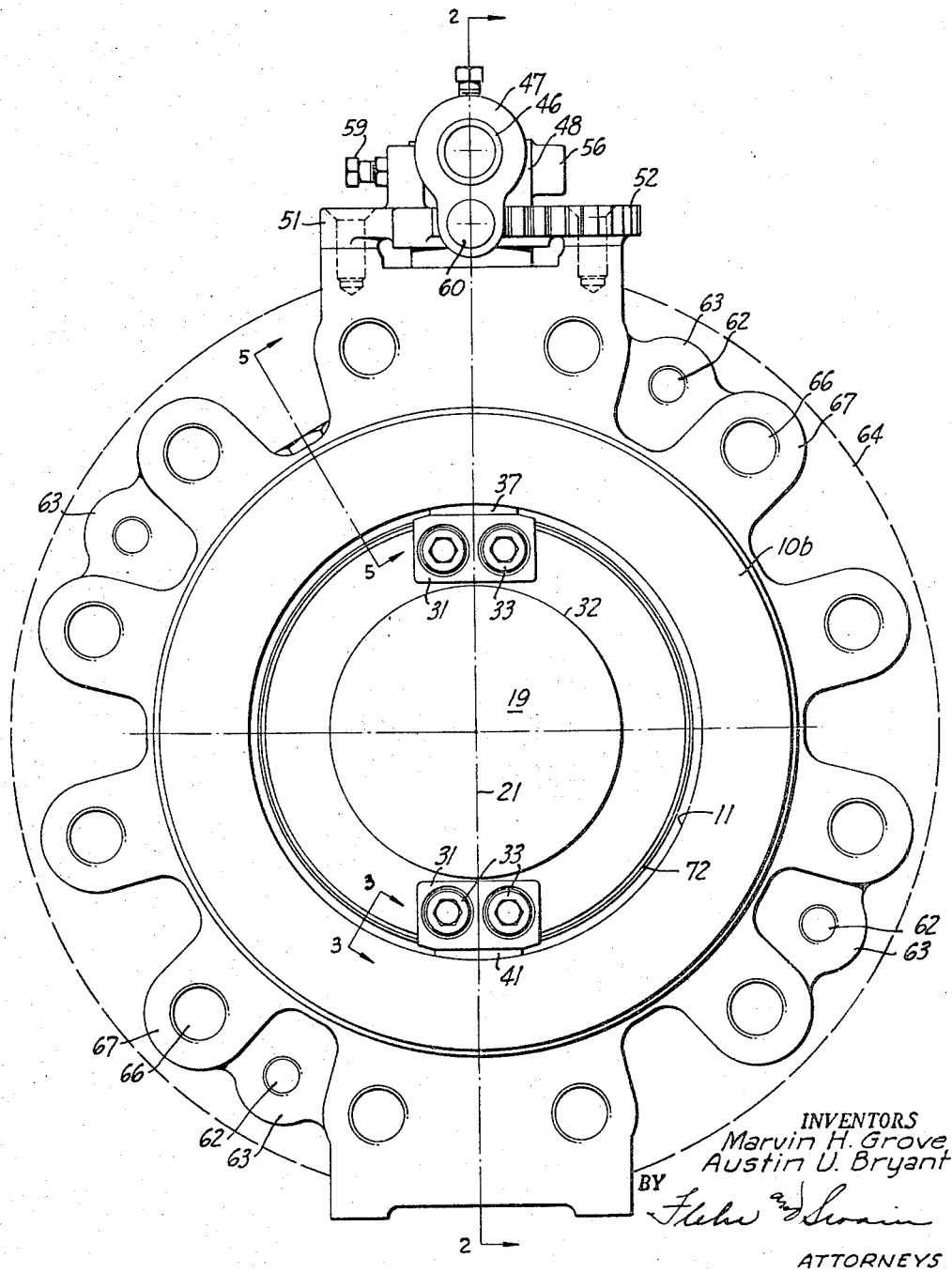

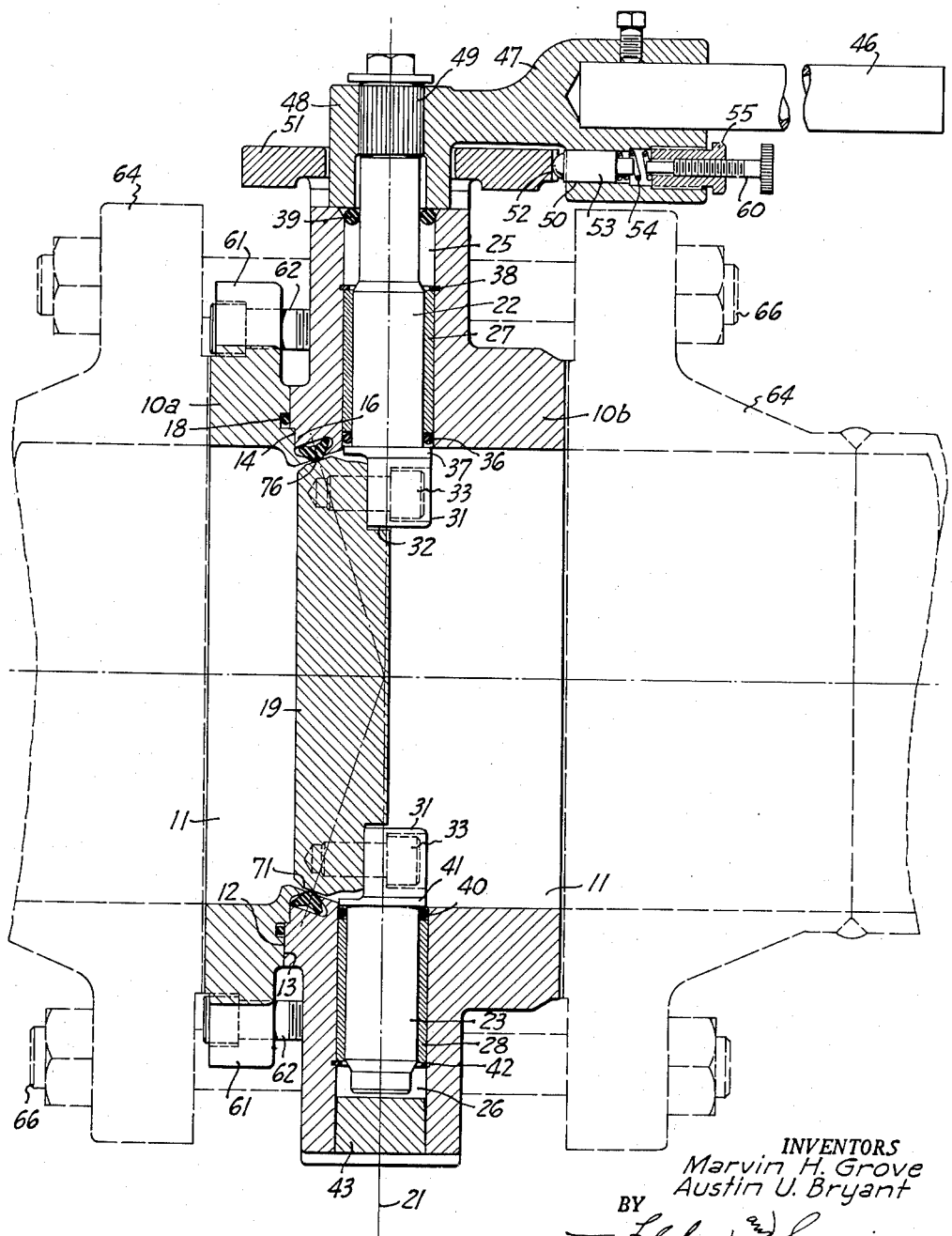

2,965,354

VALVE CONSTRUCTION

Marvin H. Grove, Piedmont, and Austin U. Bryant, Walnut Creek, Calif., assignors to Grove Valve and Regulator Company, Oakland, Calif., a corporation of California Filed Aug. 26, 1957, Ser. No. 680,249

8 Claims. (Cl. 251—173)

This invention relates generally to valves for controlling fluid flow, and particularly to valves making use of sealing means of the O-ring type.

In the past various types of valves have been constructed making use of resilient seal means of the O-ring type. As disclosed and claimed in Bryant 2,713,989, it is possible to construct such a valve capable of use on relatively high operating pressures, without dislodgement of the O-ring from its accommodating recess. O-rings such as have been used in the past in valves have been made of resilient materials like synthetic rubber, and when relaxed they are circular in section. In certain valve constructions such circular section O-rings may not give the properties desired. For example, if such an O-ring is used in a valve of the butterfly type constructed with a clearance between the periphery of the valve disc and the body, the O-ring may not maintain a proper seal between the body and the valve disc under all operating conditions, particularly if the O-ring is made of relatively hard resilient material, such as a hard synthetic rubber, or materials like nylon or Teflon. In addition the use of a circular section O-ring tends to require relatively high torques for turning the valve member between open and closed positions.

In general it is an object of the present invention to provide an improved valve construction making use of a resilient seal ring.

Another object of the invention is to provide an improved valve construction having sealing means utilizing upstream fluid pressure in a novel manner to maintain the desired seal between the body and the valve member.

Another object of the invention is to provide an improved valve construction in the form of a butterfly valve, having novel resilient sealing means, and which is characterized by relatively low torque for turning the valve member between open and closed positions.

Another object of the invention is to provide a new type of seal ring formed of resilient material, and which is adapted for use in valves for maintaining a seal when the valve member is in closed position.

Another object is to provide a butterfly type of valve of novel construction, and capable of use on relatively high operating pressures.

Additional objects and features of the invention will appear from the following description in which the preferred embodiments have been set forth in detail in conjunction with the accompanying drawing.

Referring to the drawing:

Figure 1 is an end view of a butterfly valve incorporating the present invention.

Figure 2 is a cross sectional detail taken along the line 2—2 of Figure 1.

Figure 3 is a cross sectional detail on an enlarged scale taken along the line 3—3 of Figure 1.

Figure 4 is a view like Figure 3, but showing the seal ring in a different operating position.

Figure 5 is a cross sectional detail on an enlarged scale taken along the line 5—5 of Figure 1.

Figure 6 is a detail in plan showing the operating means for the valve, and detent means associated therewith.

The valve construction illustrated in Figures 1–5 of the drawing consists of a body formed of two parts 10a, 10b. The flow passages 11 formed by these parts are adapted to be connected with associated piping. The adjacent portions of the two body parts are machined to provide the annular mating faces 12 and 13, together with the offset annular mating faces 14 and 16. An annular groove or recess is provided in body part 10a, and serves to receive the resilient seal ring 18, which serves to form a fluid tight seal between the two parts.

The valve member 19 is in the form of a disc mounted for rotation about the axis 21. As will be presently explained, it is provided with a valve working surface adapted to contact and seal with respect to a resilient seal ring carried by the body. Opposite edge portions of the valve member 19 are attached to the inner ends of the aligned shafts 22 and 23. These shafts are accommodated within the bores 25 and 26, formed in the body part 10b, and are journalled within the bushings 27 and 28. A flattened lug 31 is formed on the inner end of each shaft, and is adapted to be seated within the annular recess 32, formed in the margin of the valve member. Screws 33 serve to fix each lug to the valve member, the tolerances being such that the parts may be accurately aligned before the screws are tightened.

Suitable sealing means is provided to prevent leakage about each of the shafts. Thus resilient O-ring 36 is located adjacent the inner end of the bushing 27, and is retained by an annular collar 37 formed on the corresponding end of the shaft. The outer end of the bushing engages the snap-in ring 38. Another O-ring 39 provides protection against entrance of foreign material and serves to retain lubricant. Shaft 23 is similarly provided with a pressure seal ring 40 retained by the flange or collar 41. The outer end of the bushing 28 engages the snap-in ring 42. The outer end of bore 26 can be closed by the plug 43.

Shaft 22 has its outer end adapted for connection with suitable operating means, such as the operating handle 46. This handle is socketed within the arm 47, which is formed with a sleeve 48 internally serrated to fit upon the serrated end 49 of the shaft 22. A plate 51 is suitably secured, by means of screws, to the body of the valve, and is provided with a serrated sector portion 52. A bore 50 in the arm 47 is slidably fitted with the detent plunger 53, and this plunger is urged by spring 54 to engage the serrated sector 52. The screw 55 can be turned to adjust the spring pressure, and screw 60 may be turned to lock plunger 53 against the serrated sector. With this type of operation, the shaft is retained in any operating position to which it is turned, or may be locked in any desired position. A lug 56 on the sleeve 48 engages the adjustable stop screw 57, at full open position of the valve, while abutment shoulder 58 on the arm 47 engages the adjustable stop screw 59 for full closed position.

Suitable means are provided for clamping the two parts of the body together. Thus the circumferentially spaced ears 61 on body part 10a are engaged by screws 62 that are threaded into the ears 63 (Figure 1) on the body part 10b.

Figures 1 and 2 illustrate how the valve can be installed between coupling flanges 64 of associated piping. Clamping studs 66 are threaded into the ears 67 on the body part 10b, and serve to clamp the two parts of the body between the flanges 64.

The sealing means between the valve member and the body is shown in detail in Figures 3–5. The periphery of the valve member is machined to provide the valve working surface 71. This surface conforms to a truncated cone that is tangential to a sphere having its center coincident with the axis 21 and the axis of passage 11, and having a radius corresponding to the distance from such center to the medial portion of the surface 71. Beveled surfaces 72 and 73 are formed adjacent the edges of the surface 71, and as viewed in section (Figure 5) the beveled surfaces extend at an angle of about 30° with respect to the valve working surface. In that portion of the body which surrounds the valve member 19, an annular recess 74 is provided to accommodate the resilient seal ring 76. This seal ring is formed of a suitable elastomer, such as resilient synthetic rubber, nylon or Teflon. It may have a hardness on the durometer scale of the order of 90 or more. The configuration of the seal ring in section (Figure 3) is generally triangular. It has relatively flat side surfaces 77, and a base surface 78 which is concave as illustrated. The surface 79 forming the apex is rounded and is adapted to press against and make sealing contact with the valve working surface 71 of the valve member. The surfaces 81 on the base corners of the seal ring are likewise rounded, and merge with the side surfaces 77 and the base surface 78. The base portions 82 of the ring form legs capable of both bending and compression, thus in effect increasing the "give" afforded for a resilient material of a given hardness. The extremities of the leg portions 82 are coincident with the surface of a cone having its axis coincident with the central axis of the valve member, when the latter is in closed position.

The recess 74 within which the seal ring is accommodated is likewise contoured to be generally triangular in section. The sides of this recess are defined by lips 83 and 84, formed on the body parts 10a and 10b respectively. The side recess surfaces 86 are formed on the inner faces of the lips 83 and 84. The gap between the lips 83 and 84 is such that these lips normally compress the ring to a limited extent in two opposed regions, for the relaxed condition of the ring (i.e. when differential pressure is not being applied). Thus each lip has sealing contact with the ring for such relaxed condition, and has such engagement with the seal ring as to provide substantial mechanical retention. The bottom surface 87 of the recess conforms generally to the surface of a cone having its axis coincident with the axis of the valve member when in closed position, and this surface is in sealing contact with both of the rounded surfaces 81, for relaxed condition of the seal ring. The corners of the recess are defined by the rounded surfaces 88, which are formed to a radius slightly greater than the radius to which the surfaces 81 are formed.

The dimensioning is such that spaces 89 are present between the surfaces 77 and 86, and space 92 is present between the surfaces 78 and 87, for relaxed condition. The spaces 89 preferably are in pressure transmitting communication with the corresponding flow passages of the valve. Thus one or more small ducts 90 establish such communication for one side of the recess, and one or more similar ducts 91 establish such communication for the other side. Such communication is not essential but it aids in securing the desired application of fluid pressure to the seal ring.

As will be presently explained, the space 92 between the surfaces 78 and 87 is placed in pressure transmitting communication with the upstream (i.e. high pressure) side of the valve through an arrangement of check valves as will be presently described.

As shown in Figure 3, the rounded surface 79 of the seal ring 76 normally protrudes a substantial amount from the lips 83 and 84. The peripheral surfaces 93 and 94 of these lips conform to the surface of a cone, and they are dimensioned to have a small clearance with respect to the valve working surface 71 of the valve member. For closed position of the valve member, the rounded surface 79 of the seal ring presses against the valve surface 71, with some compression of the ring, to thereby establish fluid tight contact with the valve member, and in addition serving to press the leg portions 82 of the ring in a direction to urge the rounded surfaces 81 into fluid tight relation with the adjacent surfaces of the recess.

Figure 5 shows a suitable arrangement of check valves for establishing a communication between the space 92 at the base of the seal ring, and the upstream side of the valve. Thus two check valves 96 and 97 are provided in the body parts 10a and 10b, and may be of the ball type as illustrated. Upstream pressure applied through the duct 98 opens check 96 against its compression spring 99, to permit such pressure to be applied through ducts 101 and 102 to the space 92. Similarly the upstream pressure when applied to check 97 through duct 103, serves to open this check and apply pressure to the space 92 through the ducts 101 and 102. The check valves prevent direct bypassing of fluid from between the two sides of the valve member.

Assembly of the valve described above is as follows. The shafts 22 and 23 with their associated sealing means are first assembled within the body part 10b. Then with the shafts turned 180° from the position shown on Figure 2, the valve member 19 is inserted from the right hand side and loosely attached to the shafts by means of the screws 33. Thereafter the seal ring 76 is applied, body part 10a positioned in the manner shown with its O-ring seal 18, and the two body parts secured together by the clamping screws 62. The shafts are then rotated to bring the valve member to the position illustrated in Figure 2. Pressure applied by the seal ring upon the valve member serves to center the latter, whereby screws 33 may now be tightened to fix the shafts to the valve member.

The valve described above operates as follows: As previously mentioned when no pressure differential is being applied the seal ring 76 takes the relaxed position illustrated in Figure 3. When pressure is applied to the left hand side of the valve, the seal ring is urged by the differential fluid pressure to substantially the position shown in Figure 4. Note that the rounded portion 81 of the seal ring has been squeezed against the rounded surface 88 of the recess, and the side surface 77 of the seal ring has been pressed against the side surface 86 of the recess. The space 89 on the left hand side of the seal ring is in communication with the upstream pressure, through duct 91, and in addition the space 92 between the surfaces 78 and 87, is in communication with the upstream side through the check valve 96. Thus under such conditions the seal ring is being pressed by upstream fluid pressure in two directions, one being a side thrust by virtue of pressure applied to surface 77, and which urges the seal ring against the recess surface 86, the other being a thrust exerted by fluid pressure applied to the surface 78 of the seal ring, and which tends to urge the seal ring into fluid tight contact with the surface 71 of the valve member. When the applied differential fluid pressure is reduced, the seal ring returns to its relaxed condition, and fluid pressure in the space 92 may vent to the upstream side past the upstream base portion 82 of the seal ring. Some pressure generally remains trapped in space 92, even though the pressure is reduced to atmospheric in the body passages 11. The amount of such pressure may vary dependent upon various factors, including the squeeze pressure between surfaces 81 and 87. Assuming that a relatively high fluid pressure has been applied to one side of the valve, as for example, the maximum working pressure for which the valve is designed, the upstream pressure is transmitted through one of the check valves in the manner described above, whereby such pressure is applied to the space 92. Reduction of such applied pressure, for such maximum value back to atmospheric, is accompanied by venting a pressure from space 92 in the manner previously described, but a differential is maintained between the pressure in the space 92, and the inlet passage pressure, this differential corresponding generally to the residual trapped pressure referred to above.

Assuming now that the pressure differential is reversed, the seal ring is pressed in the opposite direction, that is to force the left hand surfaces 77 and 86 into contact. Here again the space 89 on the right hand side of the seal ring is in communication with the right hand upstream side, and the space 92 is placed in pressure communication with the upstream side, through the check valve 97. The reduction of such differential pressure again permits the seal ring to return to its relaxed condition, with some venting of pressure from the space 92.

A feature of the valve described above is that fluid pressure aids in maintaining a fluid tight seal between the body and valve members, although the material from which the seal ring is made may be relatively hard. This is in part attributed to the fact that when pressure differential is applied, the surface 78, and also one of the side surfaces 77 of the seal ring, are exposed to the upstream pressure. It is also attributed in part to the fact that the leg portions 82 are subjected to bending as well as compression, thus permitting a substantial amount of "give" without relying upon direct compression. A further feature of the valve is that although the seal ring establishes effective sealing between the body and the valve member under all operating conditions, the torque required to move the valve member to and from closed position, is relatively low compared to use of an O-ring of circular cross section and comparable hardness. Even under conditions of relatively high differential pressure, the torque required to operate the valve is relatively moderate.

When the valve member is in full open position, it contacts and presses against the seal ring at two spaced points on its circumference. When the valve stands in open position for a considerable period of time, such pressure contact may form indentations in the seal ring, with the result that when the valve is closed the seal ring does not immediately recover, and some leakage occurs. With the construction described above this difficulty is overcome due to the fact that the applied differential fluid pressure urges the seal ring against the valve member and thus there is not complete reliance upon quick recovery of the resilient material after long compression.

As will be apparent from the foregoing, our valve can be installed for application of pressure to either side. Under all differential pressures for which the valve is designed, a clearance is maintained between the periphery of the valve member and the adjacent peripheral surfaces of the body, whereby such surfaces do not rub upon turning the valve member.

By way of example, in one particular instance the valve was constructed with the general proportioning illustrated in the drawing, and with flow passages six inches in diameter. The diameter of the valve member, at the center of the contact area with the seal ring, was about 5¾ inches. The various angles indicated in Figure 3 were as follows: The angle 1 between the side surfaces 77 of the relaxed seal ring was about 60°. The angle 2 between each side surface 86, and the base 87 of the recess, was 43°. The annular gap between the lips 83 and 84 was 11/64 inch. Curved surface 79 was formed to a radius of 9/64 inch, and the curved surfaces 81 were formed on a radius of 1/32 inch. The maximum width as measured across the base of the seal ring was 27/64 inch, and the thickness as measured from surface 79 to the base line, was 9/32 inch. The ring was made of synthetic rubber having a hardness of about 98 on the durometer scale. The metal clearance between the valve member and the surfaces 93 and 94 was .008 inch for closed position. The valve operated satisfactorily for fluid pressure applied to either side, over a range of working pressures up to 600 p.s.i. After having the maximum working pressure applied to one side of the valve (for closed valve position), and then reducing such pressure to atmospheric, the space 92 retained from 150 to 200 p.s.i. trapped pressure.

The vents 90 and 91 play a part in securing the mode of operation described above. However with some change in the principle of operation, it is possible to omit these vents. Under such conditions inlet pressure applied to the space 92 urges the seal ring against the lips 83 and 84, and also against the valve working surface 71 of the valve member. Assuming that the inlet pressure is reduced from a maximum valve of say 600 p.s.i., such maximum pressure remains trapped in the space 92, unless such movement of the valve member occurs as may cause a dislodgement of the seal ring from sealing contact with the lips 83 and 84. In general it is deemed desirable to utilize the vents 90 and 91, particularly since it avoids retention of a maximum working pressure in the space 92, which may under certain conditions subject the seal ring to forces tending to cause an undesired set.

We claim:

1. In a valve of the butterfly type, a valve body formed from at least two annular parts having aligned flow passages, means for clamping the two body parts together, a disc-like valve member within the body, shaft means for mounting the valve member for turning the same between closed and opened positions, the valve member in closed position extending in a plane at right angles to the axis of the passages, a valve working surface formed on the periphery of the valve member, a resilient seal ring surrounding the valve member for closed position of the latter, said seal ring being generally triangular in section with the base of the triangular configuration being disposed in a cone having an axis concentric with the axis of said passages, the apex of said triangular configuration being rounded and forming the inner periphery of the seal ring, said apex portion having sealing contact with the valve working surface, an annular recess formed in adjacent portions of the valve body parts and serving to accommodate said seal ring, said recess having a generally triangular configuration in section, the sides of the recess being defined by annular lips formed on the body parts and which are adapted to engage and retain the seal ring within said recess, said portions of the body defining said lips defining a greater angle than the corresponding sides of the ring, the base corners of said seal ring being adapted to have sealing contact with the adjacent surface areas of the recess, and check valve means for applying upstream pressure to the base surface of said seal ring.

2. In a valve construction, a body having flow passages, a valve member movable between a closed position in which it blocks flow between the passages and an open position in which flow is permitted, a seal ring formed of a resilient material, the body having a recess dimensioned to accommodate such seal ring, the seal ring in section having a substantially triangular configuration and the recess in section likewise being of a triangular configuration and having side surfaces and a bottom surface, portions of the body that define said recess forming annular lips defining a greater angle than the corresponding sides of the ring and adapted normally to engage and press against the seal ring in opposed narrow annular regions near the apex of the same and serving to retain said seal ring within said recess, the apex of the seal ring being rounded and projecting between the lips to engage and form a seal with respect to the valve member, the sides of the recess being convergent to said lips, the seal ring being free from direct mechanical attachment with the body, the base corners of the seal ring normally pressing against and sealing with respect to the bottom surface of the recess.

3. A valve as in claim 2 together with means for applying upstream fluid pressure to the base surface of the seal ring between said base corners.

4. A valve as in claim 3 together with check valve means for establishing fluid pressure communication with either side of the valve member to admit upstream pressure to the base surface of the seal ring.

5. In a valve construction, a body having a flow passage, a disc-like valve member within the body, shaft means for mounting the valve member for turning movement of the same between closed and full open positions, the valve member when in closed position of the same extending substantially at right angles to the axis of the body, a valve working surface formed on the peripheral portion of the valve member, a seal ring formed of resilient material, an annular recess formed in the body serving to accommodate said seal ring, both the recess and the seal ring in section having substantially triangular configurations, the apex of the seal ring being rounded and the base corners of the seal ring likewise being rounded and forming bendable leg portions, portions of the body that define said recess forming annular lips defining a greater angle than the corresponding sides of the ring and normally engaging and squeezing the seal ring in narrow regions near the apex of the same, the sides of the recess being convergent to said lips, said seal ring being otherwise free of mechanical attachment to the body, the apex of said seal ring being disposed normally to establish seating contact with the valve working surface of the valve member and the leg portions of the seal ring being disposed normally to form sealing contact with the body, said seal ring being normally deformed in a direction against said leg portions whereby the seal ring is yieldably urged toward said lips.

6. A valve construction as in claim 5 in which said recess is defined by side and bottom surfaces, the side surfaces normally being spaced from the side surfaces of the seal ring but forming surfaces against which the seal ring is pressed by fluid line pressure.

7. A valve construction as in claim 6 together with means including check valves for admitting upstream fluid pressure to the base surface of the seal ring.

8. A valve as in claim 7 in which duct means serves to establish fluid communication between the sides of the recess and the corresponding sides of the valve.

References Cited in the file of this patent

UNITED STATES PATENTS

| | | |
|---|---|---|
| 1,834,870 | Rogers | Dec. 1, 1931 |
| 1,844,641 | De Wein | Feb. 9, 1932 |
| 1,872,417 | Dalldorf | Aug. 16, 1932 |
| 2,114,789 | Urquhart | Apr. 19, 1938 |
| 2,269,886 | Volpin | Jan. 13, 1942 |
| 2,360,599 | Volpin | Oct. 17, 1944 |
| 2,488,380 | Danks | Nov. 15, 1949 |
| 2,530,744 | Volpin | Nov. 21, 1950 |
| 2,621,885 | Schmitt | Dec. 16, 1952 |
| 2,655,942 | Dougherty | Oct. 20, 1953 |
| 2,732,170 | Shand | Jan. 24, 1956 |
| 2,747,611 | Hewitt | May 29, 1956 |
| 2,882,010 | Bryant | Apr. 14, 1959 |

FOREIGN PATENTS

| | | |
|---|---|---|
| 139,860 | Australia | Jan. 5, 1951 |